United States Patent [19]

Oku et al.

[11] Patent Number: 4,610,442
[45] Date of Patent: Sep. 9, 1986

[54] POSITIONING TABLE

[75] Inventors: Kenichi Oku, Toyonaka; Masaki Suzuki, Hirakata, both of Japan

[73] Assignee: Matsushita Electric Industrial Co, Ltd., Osaka, Japan

[21] Appl. No.: 621,922

[22] PCT Filed: Oct. 19, 1983

[86] PCT No.: PCT/JP83/00363

§ 371 Date: Jun. 18, 1984

§ 102(e) Date: Jun. 18, 1984

[30] Foreign Application Priority Data

Oct. 19, 1982 [JP] Japan .................................. 57-183933

[51] Int. Cl.⁴ .............................................. B23Q 1/04
[52] U.S. Cl. ...................................................... 269/73
[58] Field of Search ....................... 269/71, 73; 74/479; 108/137, 139, 400, 143; 248/184, 416

[56] References Cited

U.S. PATENT DOCUMENTS

| | | | |
|---|---|---|---|
| 3,990,689 | 11/1976 | Eklund | 269/71 |
| 4,012,030 | 3/1977 | Hesselgren | 269/71 |
| 4,114,281 | 9/1978 | Pavlovsky et al. | 269/71 |
| 4,193,317 | 3/1980 | Oono et al. | 269/71 |
| 4,417,843 | 11/1983 | Bonga | 269/73 |
| 4,492,356 | 1/1985 | Taniguchi et al. | 269/73 |

FOREIGN PATENT DOCUMENTS

| | | | |
|---|---|---|---|
| 2817024 | 11/1978 | Fed. Rep. of Germany | 269/73 |
| 2728587 | 11/1979 | Fed. Rep. of Germany | 269/73 |

Primary Examiner—Robert C. Watson
Attorney, Agent, or Firm—Wenderoth, Lind & Ponack

[57] ABSTRACT

A positioning table device which includes a flat table supported so as to be displaceable both angularly and linearly in a plane. Three pushers having end faces abutting respective rollers are provided such that linear movements of the pushers in a plane parallel to the plane of the table in different reciprocal directions allows exact positioning and rotational movements of the table with any arbitrary position on the table as the center of rotation. In the preferred embodiments, the rollers are rotatable about axes of rotation perpendicular to the plane of the table and two of the end faces are parallel, the third being perpendicular thereto.

5 Claims, 10 Drawing Figures

POSITIONING TABLE

BACKGROUND OF THE INVENTION

1. Technical Field

The present invention relates to a positioning table, for example, for positioning the mask of exposing devices in manufacturing semiconductors, the positioning to be done on a plane, and provides a positioning table which is low in total height, has high rigidity, and which permits exact positioning to be done, involving small backlash, and rotational movement to be made, with an arbitrary point on the movable table as the center of rotation.

2. Prior Art

The conventional positioning table is composed, particularly as shown in FIG. 1, of an x-table 2 having an x-direction straight-line guide 1, a y-table 4 having a y-direction straight-line guide 3 on the x-table 2, and a rotary table 6 having a rotary shaft 5 placed on the y-table, said tables being piled one upon another, with the movement in the x-direction provided by the drive of a motor 8 fixed on a base 7, the movement in the y-direction provided by the drive of a motor 9 fixed on the x-table, and the rotational movement provided by the drive of a motor fixed on the y-table 4.

In the aforementioned construction, the x-table 2 and the y-table 4 which move in two criss-crossing directions are piled one upon another and on them, the rotary table 6 is further superposed, thereby providing a triple stacked construction. Consequently, the total height of the positioning table is high and its rigidity low. Besides, since the rotary shaft 5 of the rotary table 6 was secured in a set position on the y-table 4, it was impossible to make the rotational movement, with an arbitrary position on the y-table 4 as the center of rotation. Further, large bearing friction in the straight line movements and the rotational movement result in large backlash, giving rise difficulty in positioning.

BRIEF SUMMARY OF THE INVENTION

The present invention provides a positioning table comprising a flat plate table, control means for making the movement of the aforementioned table on a plane, three axial feeding means each capable or reciprocal movement on a straight line and a means for controlling the directions of operation of the aforementioned three axial feeding means, the aforementioned positioning table having low total height and high rigidity and permitting exact positioning and a rotary movement, with an arbitrary position of the movable table as its center of rotation.

DETAILED DESCRIPTION OF THE PREFERRED EMBODIMENTS

Figure 1:
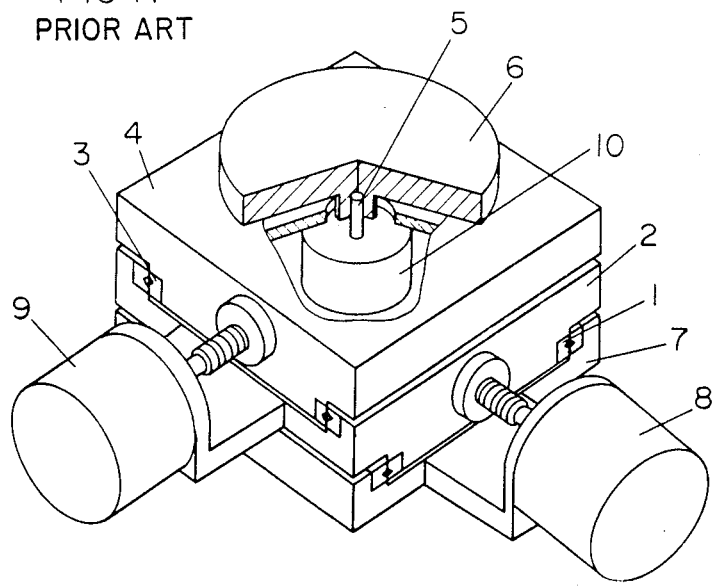
FIG. 1 is a partly broken away perspective view of a conventional positioning table.
Figure 2:
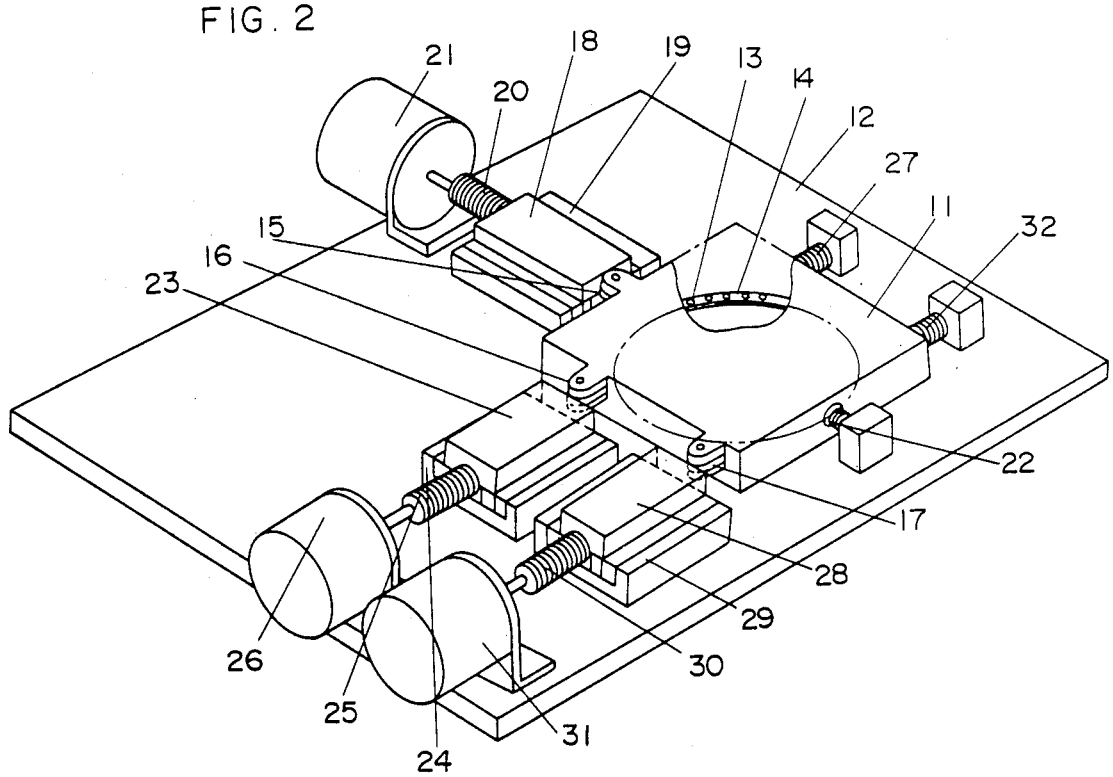
FIG. 2 is a perspective view of a positioning table of a first embodiment of this invention.

In the following, an embodiment of this invention is described with reference to the accompanying drawings: FIG. 2 shows a positioning table of an embodiment of this invention. Numeral 11 denotes a movable table; 12, base; 13, a group of balls with same diameter for so controlling the aforementioned movable table as to move on a flat surface; 14, a cage for constraining the aforementioned group of balls 13 from scattering and holding the aforementioned group of balls 13 in such a way that they can move in whatever direction, while turning; 15, an X-roller attached to one end surface of the aforementioned movable table 11, with its rotational axis held perpendicular to base 12; 16 and 17, a Y1-roller and a Y2-roller attached to an end surface of the aforementioned movable table 11 perpendicular to the end surface on which the aforementioned X-roller 15 is mounted, with their rotational axes held perpendicular to the aforementioned base 12; and 18, a feeding means, for example, on X-roller pusher, with its end surface in contact with the aforemention X-roller 15, held perpendicular to the aforementioned base 12. Numeral 19 designates an X-straight line guide for so controlling the aforementioned X-roller pusher 18 as to make a straight line movement in parallel with the aforementioned base 12, 20 an X-screw shaft for making the straight-line movement of the aforementioned X-roller pusher 18; 21, an X-motor for driving the aforementioned X-screw shaft 20; 22, and X-spring fot always pressuring the aforementioned movable table 11 in the direction of pushing the aforementioned X-roller 15 against the aforementioned roller pusher 18; and 23, a Y1-roller pusher with its end surface in contact with the aforementioned Y1-roller 16 held perpendicular to the aforementioned base 12, and held perpendicular to the end surface of the aforementioned X-roller pusher 18 which is in contact with the aforementioned X-roller 15. Numeral 24 designates a Y1 straight line guide for so controlling the aforementioned roller pusher 23 as to make a straight line movement in a direction parallel to the aforementioned base 12 and perpendicular to the direction of the straight-line movement of the aforementioned X-roller pusher 18; 25, a Y1-screw shaft for making the straight-line movement of the aforementioned Y1-roller pusher; 26, Y1-motor for driving the aforementioned Y1-screw shaft; 27, a Y1-spring for always pressuring the aforementioned movable table 11 in the direction of pushing it against the aforementioned Y1 pusher 23; and 28, a Y2-roller pusher with its end surface in contact with the aforementioned Y2 roller 17 in parallel with that of the aforementioned Y1-roller pusher 23. Numeral 29 designates a Y2-straight-line guide for so controlling the aforementioned Y2-roller pusher 28 as to make a straight-line movement in parallel with the aforementioned Y1-roller pusher 23; 30, a Y2-screw shaft for making the straight line movement of the aforementioned Y2-roller pusher 28; 31, a Y2-motor for driving the aforementioned Y2-screw shaft 30; and 32, a Y2-spring for always pressuring the movable table in the direction of pushing the aforementioned Y2-roller 17 against the aforementioned Y2-pusher 28.

Operation of the positioning table constructed as hereabove stated is described hereunder: First, by turning through specified angles the X-motor 21, Y1-motor 26 and Y2-motor 31, respectively, the X-roller pusher 18, Y1-roller pusher 23 and the Y2-roller pusher 28 may be moved predetermined distance on straight lines through the X-screw shaft 20, Y1-screw shaft 25 and Y2-screw shaft 30. Since the X-roller 15, Y1-roller 16 and the Y2-roller 17 are always so pressured by the X-spring 22, Y1-spring 27 and Y2-spring 32, respectively, as to be in contact with the X-roller pusher 18, Y1-roller pusher 23 and Y2-roller pusher 28, the distance moved by the X-roller 15 in the moving direction of the X-roller pusher 18 is equal to the distance moved by the X-roller pusher; likewise, the distance moved by the Y1-roller 16 in the moving direction of the Y1-roller pusher 23 is equal to that of the Y1-roller pusher; and the distance moved by the Y2-roller 17 in the moving direction of the Y2-roller pusher 28 is equal to that of the latter. Along with these motions, the X-roller 15 can move, while turning, in the direction perpendicular to the moving direction of the X-roller pusher 18 along an end surface of the X-roller pusher 18 and, likewise the, Y1-roller and Y2-roller can move, while turning, in a direction perpendicular to the moving direction of the Y1-roller pusher 23 and the Y2-roller pusher 28 along the end surface of the Y1-roller pusher 23 and the end surface of the roller pusher 28, respectively. Accordingly, the movable tabel 11 is moved a predetermined distance.

Figure 3:
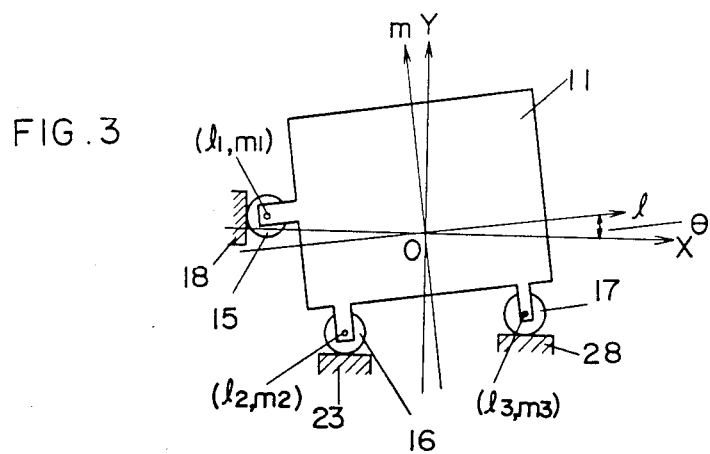
FIGS. 3 and 4 are views for explanation of the same.

Now, the relationship between the distances moved by the X-roller pusher 18, Y1-roller pusher 23 and Y2-roller pusher 28, the distance moved by an arbitrary point on the movable table 11 and the angle turned by the movable table with this point as the center is described hereunder: Referring to FIG. 3, an orthogonal coordinate system is conceived, with an arbitrary point o on the movable table 11 as the origin, and in an lm coordinate system, with the straight line parallel to the straight lines passing the centers of the Y1-roller 16 and Y2-roller 17, respectively, and passing through the origin o as the l-axis, and with the axis passing through the origin o and perpendicular to the l-axis as the m-axis, the coordinates of the centers of the X-roller 15, Y1-roller 16 and the Y2-roller 17 are respectively set at $(l_1, m_1)$, $(l_2, m_2)$ and $(l_3, m_3)$. Likewise, in an orthogonal coordinate system (designated XY-coordinate system), with o as its origin, the straight line parallel to the end surface of the X-roller pusher 18 and passing through the origen o as the Y-axis, and with the axis passing through the origen o and perpendicular to the Y-axis as the X-axis, if the angle between the l-axis and the X-axis is set $\theta$ and the coordinates of the centers of the X-roller 15, Y1-roller 16 and the Y2-roller 17 represented by the lm coordinate system are converted into the XY-coordinate system then, the coordinates of the center of the X-roller 15 $(x1', y1')$, the coordinates of the center of the Y1-roller 16 $(x2', y2')$, and the coordinates of the center of the Y2-roller 17 $(x3', y3')$ will be given by, $$\begin{pmatrix} xi' \\ yi' \end{pmatrix} = \begin{pmatrix} \cos\theta & -\sin\theta \\ \sin\theta & \cos\theta \end{pmatrix} \begin{pmatrix} li \\ mi \end{pmatrix}$$

$i = 1, 2, 3$

Figure 4:
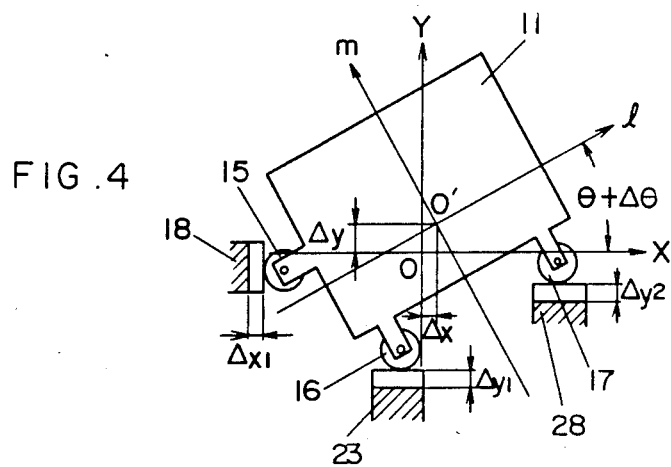

Then, as shown in FIG. 4, the origin o on the movable table 11 is transferred from the position shown in FIG. 3 to a point o' distanced $\Delta x$ therefrom in the X-direction and $\Delta y$ in the Y-direction in the XY-coordinate system and the table is turned $\Delta\theta$ with o' as the center, the coordinates $(x1'', y1'')$, $(x2'', y2'')$ and $(x3'', y3'')$ of the centers of the X-roller 15, Y1-roller 16 and Y2-roller 17 in the XY-coordinate system are represented by, $$\begin{pmatrix} xi'' \\ yi'' \end{pmatrix} = \begin{pmatrix} \cos(\theta + \Delta\theta) & -\sin(\theta + \Delta\theta) \\ \sin(\theta + \Delta\theta) & \cos(\theta + \Delta\theta) \end{pmatrix} \begin{pmatrix} li \\ mi \end{pmatrix} + \begin{pmatrix} \Delta x \\ \Delta y \end{pmatrix}$$

$i = 1, 2, 3$

Accordingly, the deflections $\Delta xi$ and $\Delta yi$ of the coordinates of the centers of the three rollers when the movable table 11 is moved from the position shown in FIG. 3 to the position shown in FIG. 4 are given by, $$\begin{pmatrix} \Delta xi \\ \Delta yi \end{pmatrix} = \begin{pmatrix} xi'' \\ yi'' \end{pmatrix} - \begin{pmatrix} xi' \\ yi' \end{pmatrix}$$

$$= \begin{pmatrix} \cos(\theta + \Delta\theta) & -\sin(\theta + \Delta\theta) \\ \sin(\theta + \Delta\theta) & \cos(\theta + \Delta\theta) \end{pmatrix} \begin{pmatrix} li \\ mi \end{pmatrix} + \begin{pmatrix} \Delta x \\ \Delta y \end{pmatrix}$$

$$- \begin{pmatrix} \cos\theta & -\sin\theta \\ \sin\theta & \cos\theta \end{pmatrix} \begin{pmatrix} li \\ mi \end{pmatrix}$$

$$= \begin{pmatrix} \cos(\theta + \Delta\theta) - \cos\theta & -(\sin(\theta + \Delta\theta) - \sin\theta) \\ \sin(\theta + \Delta\theta) - \sin\theta & \cos(\theta + \Delta\theta) - \cos\theta \end{pmatrix}$$

$$\begin{pmatrix} li \\ mi \end{pmatrix} + \begin{pmatrix} \Delta x \\ \Delta y \end{pmatrix}$$

$i = 1, 2, 3$

From the above relationship, the deflection $\Delta xi$ in the X-axis direction of the X-roller 15, the deflection $\Delta y1$ in the Y-axis direction of the Y1-roller 16 and the deflection $\Delta y2$ in the Y-axis direction of the Y2-roller are represented by, $\Delta x1 = \{\cos(\theta + \Delta\theta) - \cos\theta\}l1 -$ $\{\sin(\theta + \Delta\theta) - \sin\theta\}m1 + \Delta x$ $\Delta y1 = \{\sin(\theta + \Delta\theta) - \sin\theta\}l2 +$ $\{\cos(\theta + \Delta\theta) - \cos\theta\}m2 + \Delta y$ $\Delta y2 = \{\sin(\theta + \Delta\theta) - \sin\theta\}l3 +$ $\{\cos(\theta + \Delta\theta) - \cos\theta\}m3 + \Delta y$ Accordingly, in order that an arbitrary point o on the aforementioned movable table move $\Delta x$ in the X-direction, $\Delta y$ in the Y-direction, and that said table turn $\Delta\theta$, respective rollers should move $\Delta x1$, $\Delta y1$ and $\Delta y2$.

As hereabove described, according to this embodiment, with a moveable flat plate table so controlled as to move in a plane provided with three axial positioning means so controlling as to be always in contact with end surfaces of the aforementioned movable table and make reciprocating movements on straight lines, then as respective straight-line movements of the aforementioned three axial positioning means for the distances as determined by calculations are made, the aforementioned movable table can be turned an arbitrary angle, with an arbitray point on the aforementioned movable table as the center, and also moved an arbitrary distance in a plane. The low total height of the positioning table makes for high rigidity and enables exact positioning. Further, because of small bearing friction in the straight line movement and the rotational movement, a positioning table involving small backlash may be provided.

Figure 5:
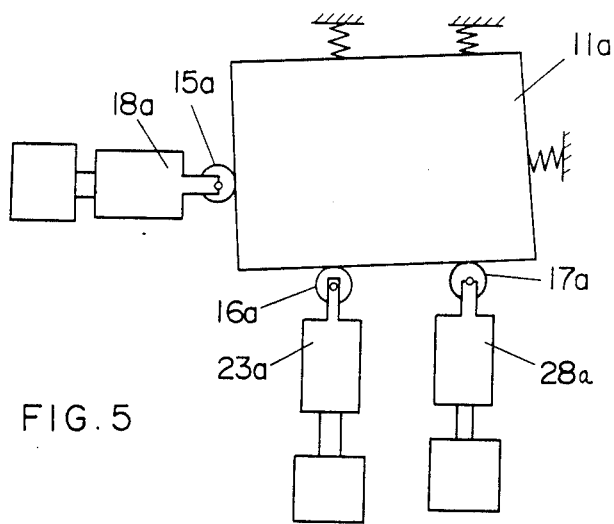
FIG. 5 is a view schematic exploratory of a positioning table of a second embodiment.

In the following a second embodiment, is described, with reference to FIG. 5. Reference code 11a denotes a movable table; 15a, 16a and 17a, respectively on, X-roller, Y1-roller and Y2-roller; 18a, 23a, and 28a, respectively, X-roller pusher, a Y1-roller on pusher, and a Y2-roller pusher. While the method of controlling the movable table 11a, the arrangement, method of control and method of driving the X-roller pusher 8a, Y1-roller pusher 23a and Y2-roller pusher 28a are the same as in the construction of FIG. 2, difference lies in that an X-roller 15a, Y1-roller 16a and a Y2-roller 17a are provided at the tips of the X-roller pusher 18a, Y1-roller pusher 23a and Y2-roller pusher 28a. Also, in the positioning table constructed as hereabove discribed, by moving the X-roller pusher 18a, Y1-roller pusher 23a and Y2-roller pusher 28a for respective distances, it is possible to move the movable table 11a for the predetermined distance. Further, a similar formula relating the distance of movement of an arbitrary point on the movable table 11a and the distances of movement of the X-roller 15a, Y1-roller 16a and Y2-roller 17a may be obtained.

Figure 6:
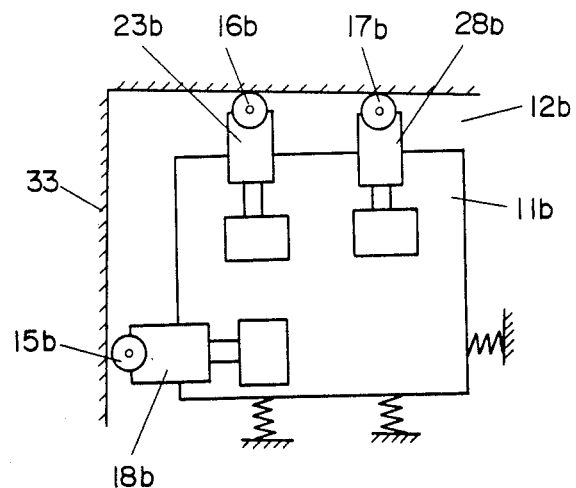
FIG. 6 is a schematic exploratory view of a positioning table of a third embodiment.

In the following, a third embodiment of this invention is described, with reference to FIG. 6. Reference code 12b denotes a base; 11B, a movable table; 15b, 16b and 17b respectively, an X-roller, a Y1-roller and a Y2-roller; 18b, 23b and 28b, respectively, an X-roller pusher, a Y1-roller pusher and a Y2-roller pusher; and 33, a guide having two surfaces perpendicular to each other and mounted on the base 12b. While the method of controlling the movable table 21b, and the method of controlling and the method of driving the X-roller pusher 18b, Y1-roller pusher 23b and Y2-roller pusher 28b are the same as in the construction of FIG. 2, differences lie in that an X-roller 15b, Y1-roller 16b and Y2-roller 17b are provided, respectively, at the tips of the X-roller pusher 18b, Y1-roller pusher 23b and Y2-roller pusher 28b, and that the aforementioned three roller pushers are installed on the movable table 11b. Also in the positioning table constructed as above-described, by moving the X-roller pusher 18b, Y1-roller pusher 23b and the Y2 roller pusher 28b, respectively, for specified distances, it is possible to move the movable table 11b for a predetermined distance. Besides, a similar formula relating the distance of movement of movement of an arbitrary point on the movable table 11b and the distances moved by the X-roller 15b, Y1-roller 16b and Y2-roller 17b may be obtained.

Figure 7:
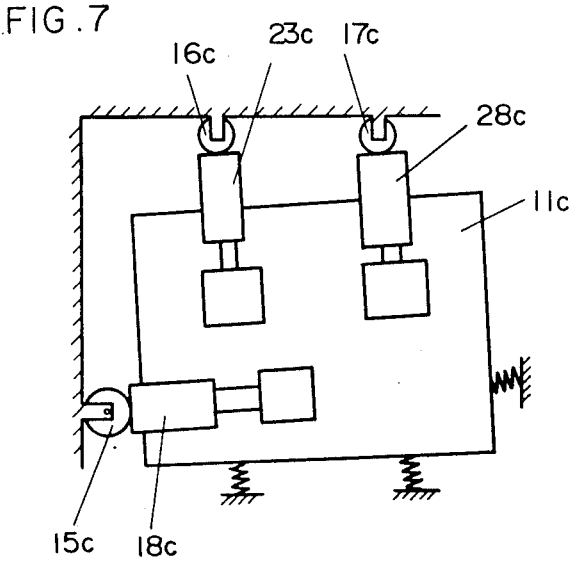
FIG. 7 is a schematic exploratory view of a positioning table of a fourth embodiment of this invention.

In the following, a fourth embodiment is described, with refernce to FIG. 7. Reference code 11c denotes a movable table; 15c, 16c and 17c, respectively, X-roller, Y1-roller and Y2-roller; 18c, 23c and 28c, respectively, on X-roller pusher, a Y1-roller pusher and a Y2-roller pusher. While the method of controlling the movable table 11c, and the method of controlling and the method of driving the X-roller pusher 18c, Y1-roller pusher 23c and the Y2-roller pusher 28c are the same as in the construction of FIG. 2, the differences lie in that three roller pushers are installed on the movable table 17c and that the rotary shafts of the X-roller 15c, Y1-roller 16c and Y2-roller 17c are secured in place outside the movable table. Also in the positioning table as constructed as described hereabove, it is possible to move the movable table 11a a predetermined distance by moving specified distances the X-roller pusher 18c, Y1-roller pusher 23c and the Y2-roller pusher, respectively. Besides, a similar formula relating the distance of movement of an arbitrary point on the movable table with the distances moved by the X-roller 15c, Y1-roller 16c and Y2-roller 17c may be obtained.

It should be noted that in first through fourth embodiments 1, the controlling means for making the movement of the movable table in a plane is provided as a group of balls, but such a controlling means may be a sliding bearing or fluid bearing; any construction which permits the movement of the movable table in a plane will do.

Besides, for the rectilinear motion of the roller pusher in the first through fourth embodiments, the drive source is provided by converting the rotation of a motor into the rectilinear motion by a screw shaft, but a linear motor, etc., may be put to use; any construction which permits the rectilinear motion of the roller pusher will do.

Figure 8:
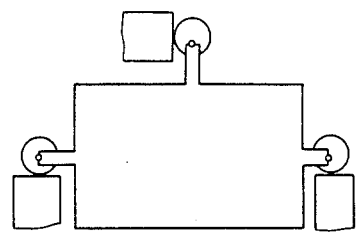
FIGS. 8~10 are schematic exploratory views of the positioning table of the first embodiment of this invention in which the locations of the rollers of the positioning table of the first embodiment of this invention are altered.
Figure 9:
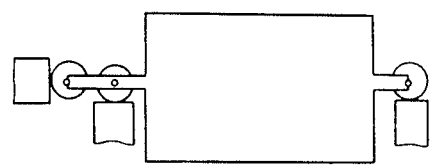
Figure 10:
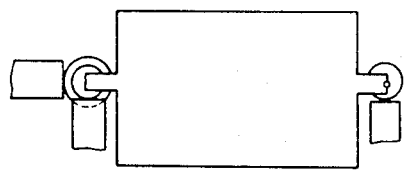

In the first embodiment, the attachment of the rollers in made in an arrangement as shown in FIG. 2, but such arrangements as shown in FIGS. 8 through 10 are usable; any arrangement will do in which, of the three axial straight line feeding means, the directions of the two axial movements are parallel and perpendicular to the direction of the other axis.

As hereabove-described, according to this invention, by providing a flat plate table, a controlling means for making the movement of the aforementioned table in a plane, three axial feeding means for making rectilinear motions always in contact with the aforementioned table on a plane parallel to the plane in which the aforementioned table moves, and a means to control the directions of operation of the aforementioned three axial feeding means, it becomes possible to make the total height of the positioning table low, its rigidity low and backlash small, enabling precision positioning, and rotational movement, with an arbitrary position on the movable table as the center of rotation. Thus its practical application is enormous.

What is claimed is:

1. A positioning table device comprising a flat table so supported as to be displaceable both angularly and linearly in a first plane, a first, a second and a third roller each having an axis of rotation perpendicular to said first plane, and a first, a second and a third feeding means each having an end face abutted against a corresponding one of said first, second and third rollers and being linearly movable in a plane parallel to said first plane such that the end face of said first feeding means is maintained perpendicular to the end faces of said second and third feeding means for all linear movements of first, second and third feeding means.

2. A positioning table device as in claim 1, wherein said rollers are rotatable mounted on said table with their axes of rotation fixed with respect ot said table.

3. A positioning table device, comprising:
a flat table;
means for supporting said table so as to be displaceable linearly and angularly in a plane;
three rollers including a first roller, a second roller and a third roller having respective axes of rotation perpendicular to said plane; and first, second and third means, respectively having a first end face abutting said first roller so that said first roller is rollable on said first end face, a second end face abutting said second roller so that said second roller is rollable on said second end face, and a third end face abutting said third roller so that said third roller is rollable on said third end face, for respectively pushing against said table in first, second and third directions respectively perpendicular to said first end face, said second end face and said third end face, said first end face being perpendicular to said second and third end faces, either the axes of said three rollers or said first, second and third end faces being fixed with respect to said table.

4. A positioning table device, comprising:

a flat table;

means for supporting said table so as to be displaceable linearly and angularly in a plane;

a first roller, a second roller and a third roller mounted on said table, having respective axes of rotation perpendicular to said plane and fixed with respect to said table; and first, second and third means, respectively having a first movable end face abutting said first roller so that said first roller is rollable on said first end face, a second movable end face abutting said second roller so that said second roller is rollable on said second end face, and a third movable end face abutting said third roller so that said third roller is rollable on said third end face, for respectively pushing against said table in first, second and third directions respectively perpendicular to said first end face, said second end face and said third end face, through said first, second and third rollers, said first end face being perpendicular to said second and third end faces.

5. A positioning table device as in claim 4, wherein said first, second and third means include, respectively, a first pusher having said first end face thereon, a second pusher having said second end face thereon, and a third pusher having said third end face theron, said first, second and third pushers making rectilinear motions such that said first, second and third end faces are always in abutting contact with said first, second and third rollers and respectively feed out said table in said first, second and third directions with corresponding movements of said first, second and third end faces.

* * * * *